June 6, 1967 — P. F. HUNT — 3,323,836
SEATS SUITABLE FOR VEHICLES
Filed Oct. 19, 1965 — 2 Sheets-Sheet 1

Inventor
Peter Frederick Hunt
BY
A. L. Trueax, Jr.
Attorney

June 6, 1967 P. F. HUNT 3,323,836
SEATS SUITABLE FOR VEHICLES
Filed Oct. 19, 1965 2 Sheets-Sheet 2
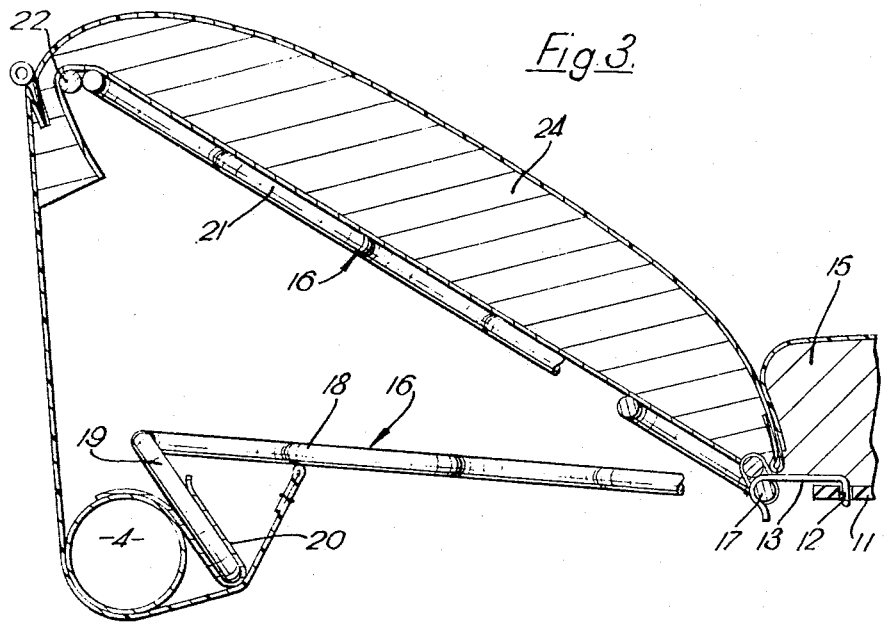
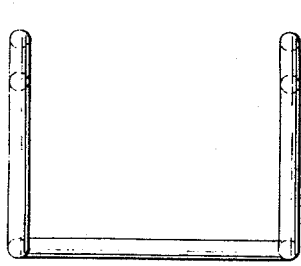
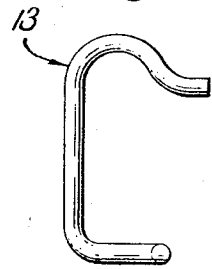
Inventor
Peter Frederick Hunt
BY
Attorney

United States Patent Office 3,323,836
Patented June 6, 1967

3,323,836
SEATS SUITABLE FOR VEHICLES
Peter Frederick Hunt, Tring, England, assignor to General Motors Corporation, Detroit, Mich., a corporation of Delaware
Filed Oct. 19, 1965, Ser. No. 497,625
Claims priority, application Great Britain, Nov. 19, 1964, 47,137/64
5 Claims. (Cl. 297—456)

This invention relates to seats suitable for vehicles.

By the invention it is possible to construct a resiliently-supported seat having different degrees of hardness as between the edges and the central part of a cushion.

Figure 1:
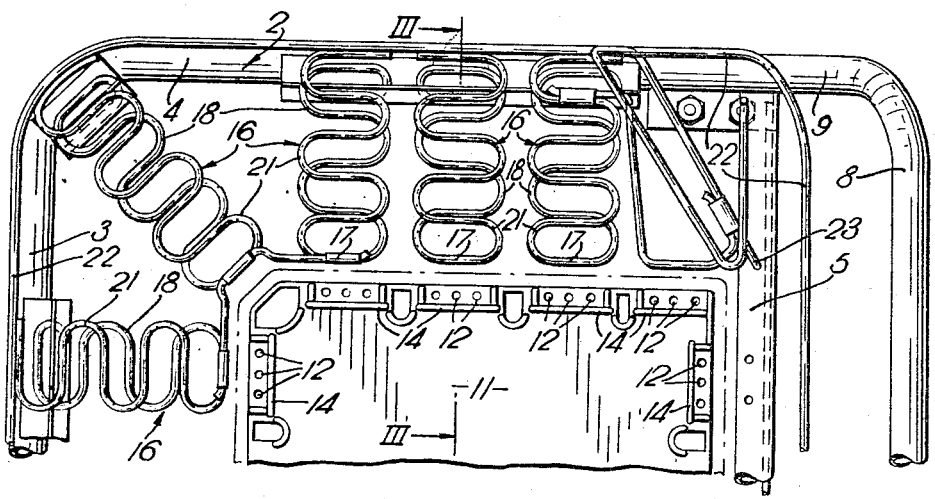
Figure 2:
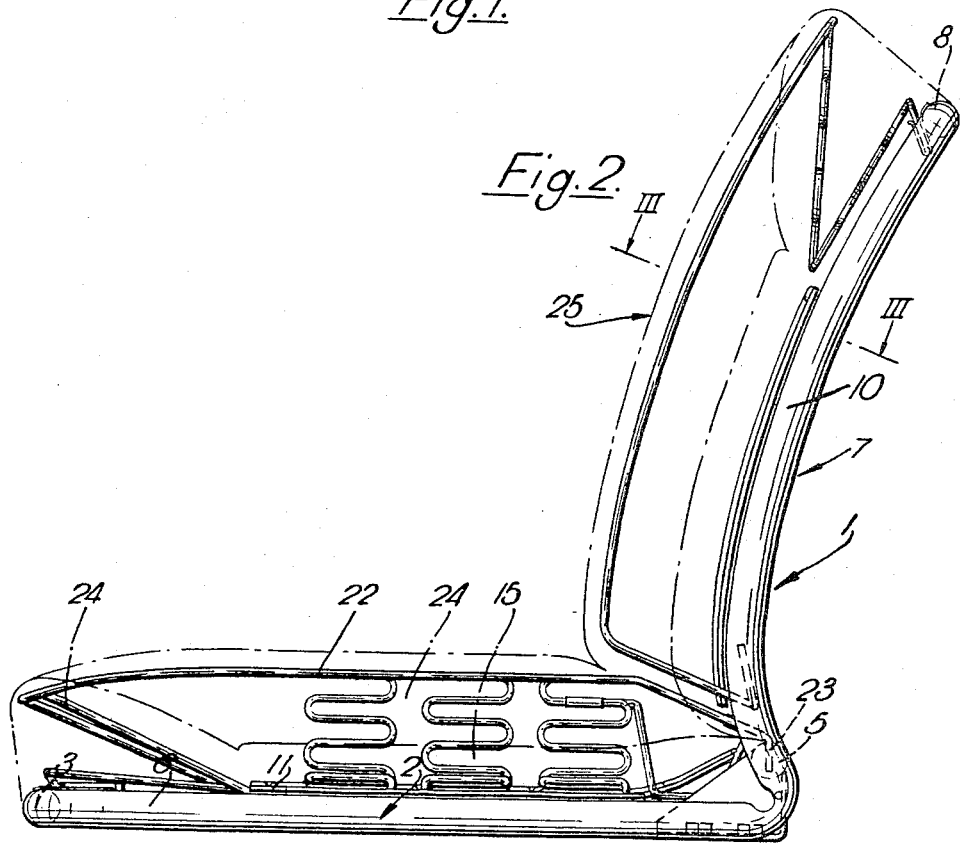

The scope of the invention is defined by the appended claims; how the invention may be performed is particularly described below with reference to the accompanying diagrammatic drawings, in which:

FIGURE 1 is a half-plan of a vehicle seat;
FIGURE 2 is a side elevation of the same seat;
FIGURE 3 is a section on the line III—III in FIGURE 1;
FIGURES 4 and 5 are views, at right angles to each other, of a hook or link used in the seat assembly.

The seat shown in the drawings has a tubular metal frame 1 of approximately L shape as viewed from the side (FIGURE 2), the tubes forming a support frame 2 with four sides 3, 4, 5, 6 for the seat bottom, and a support frame 7 with three sides 8, 9, 10 for the seat back.

The seat bottom is made up of a rectangular sheet of rubber 11 having attached to its four sides, by insertion into holes 12, a suitable number of metal hooks or links 13 (FIGURES 3 to 5) for attaching the rubber sheet to the frame, as described below. The edges of the rubber are reinforced by metal inserts 14.

This rubber sheet 11 supports a cushion squab 15 by connecting the rubber sheet, with a suitable amount of stretch on the rubber, to the four tubular frame elements 3, 4, 5, 6 by means of wire tension springs such as 16 which are connected to the hooks 13 on the rubber sheet 11 and are themselves connected to the frame 3, 4, 5, 6. Note that in FIGURE 1 the rubber sheet 11 is shown in both stretched and unstretched position. The hooks 13 are omitted, the attachment by the hooks being apparent from FIGURE 3.

The connection of the rubber sheet 11 to the tension springs 16 is on three sides of the sheet. Each tension spring 16 consists of wire bent into zig-zag or sinuous shape (FIGURE 1), the spring 16 as a whole being of angular formation, as shown in FIGURE 3. The apex 17 of the angle is linked to the hooks 13 projecting from the rubber sheet 11, the lower arm 18 of the angle is bent back at 19 and hooked on to a socket length 20 welded to the tubular frame member 4, leaving the second or upper arm 21 of the angle projecting upwards at an acute angle to the plane of the rubber sheet 11. The upper arms 21 of the angle tension springs 16 are connected along three sides of the seat squab 15 by a border wire 22 the ends 23 of which are bent inwards and inserted into holes in a transverse member 5 of the frame. The rubber sheet 11 is attached to the frame along the fourth side by short links or hooks 13 which connect it to the same transverse member 5 of the frame by engaging in holes therein.

On the three sides mentioned of the seat, the tension springs 16 are covered by a border pad 24 which is separate from the main seat cushion 15 which is central.

The combination of the rubber sheet 11 and the wire tension springs 16 enables the hardness as between the centre and edges of the seat to be varied. For example, a seat can be designed with firm central suspension given by the rubber sheet 11 and cushion 15 and a soft border given by the tension springs 16 and the border pads 24. Alternatively, a soft centre part with a hard border may be obtained. For the centre cushion 15 and the border pads 24, thin padding of uniform thickness can be used.

The seat back 25 and its method of fixing to the tubular frame 1 is substantially the same as for the seat bottom; except that the seat back 25 does not need to be connected to the tubular frame along the fourth side 5, which is at the lower edge of the seat back. Adequate support of the back cushion 25 is given by using wire tension springs 16 to attach it to the tubular framework 8, 9, 10 along each side and along the top.

FIGURE 3, which is a section on the line III—III in FIGURE 1, can be taken as also showing the corresponding section of the seat back, as at III—III in FIGURE 2.

I claim:
1. A seat including a frame, a rectangular resilient sheet, a cushion supported by said sheet, and tension springs of sinuous wire and attaching three edges of the sheet to the frame; each tension spring including two arms at an acute angle to each other, and said springs being attached to the resilient sheet by the apex of the said angle and attached to the frame by one of the said arms of the angle.

2. A seat according to claim 1, in which the tension springs are attached to the frame by a bent end of each spring being lodged in a socket formed by a length of sheet metal bent into hook-shaped cross-sectional form and fixed to the frame.

3. A seat according to claim 1, having a border pad covering the wire springs, said pad being separate from, and enclosing the border of, the cushion.

4. A seat according to claim 3, having along the border pad a border wire attached to the ends of the second arms of the tension springs on three sides of the cushion, the ends of said border wire being attached to the frame on the fourth side of said cushion.

5. A seat including a frame, a resilient sheet, a cushion supported by said sheet, tension springs of sinuous wire attaching the edges of the sheet to the frame, each of the tension springs having two arms at an acute angle to each other and being attached to the resilient sheet by the apex of said angle, one of said arms attached to the frame by a bent end lodged in a socket formed by a length of sheet metal bent into a hook-shaped cross-sectional form fixed to the frame, a border pad covering the tension spring, and a border wire attached to the ends of the other of said arms.

References Cited
UNITED STATES PATENTS

| 2,158,441 | 5/1939 | Thum | 267—112 |
| 2,273,273 | 2/1942 | Kris | 267—112 |
| 3,039,763 | 6/1962 | Staples et al. | 267—107 |
| 3,071,413 | 1/1963 | Flint et al. | 297—456 |
| 3,088,773 | 5/1963 | Horrocks et al. | 297—452 |
| 3,145,986 | 8/1964 | Vogel | 267—102 |

CASMIR A. NUNBERG, Primary Examiner.